I. S. DOWNING.
CAR BRAKE RIGGING.
APPLICATION FILED FEB. 13, 1912.
1,027,379.
Patented May 21, 1912.
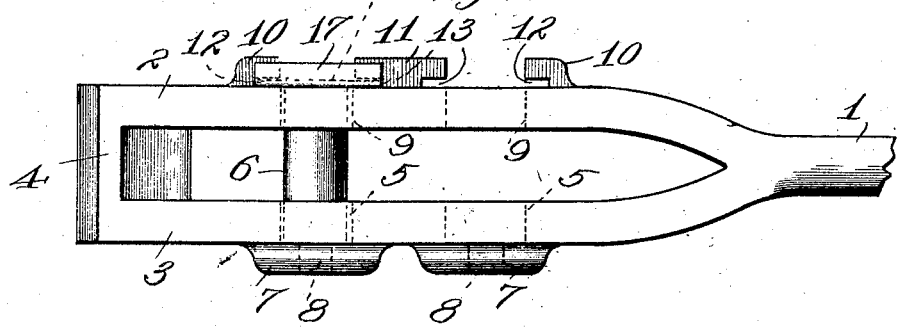
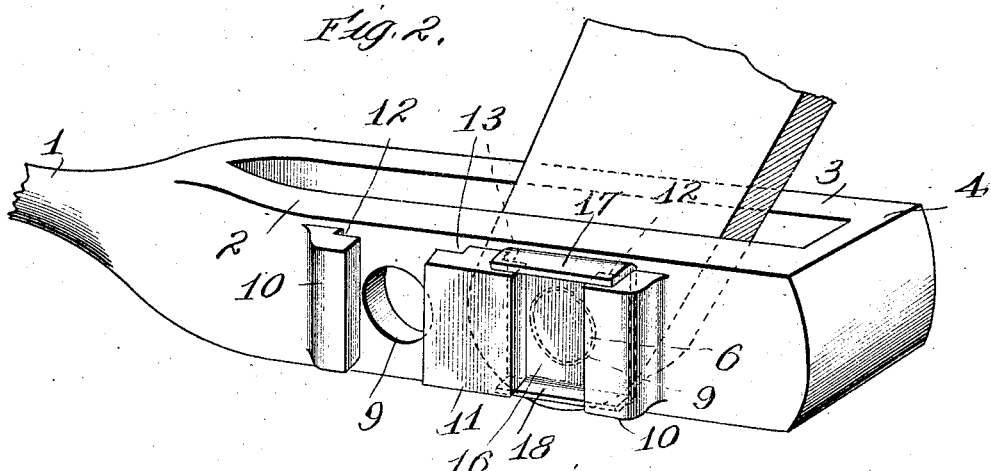
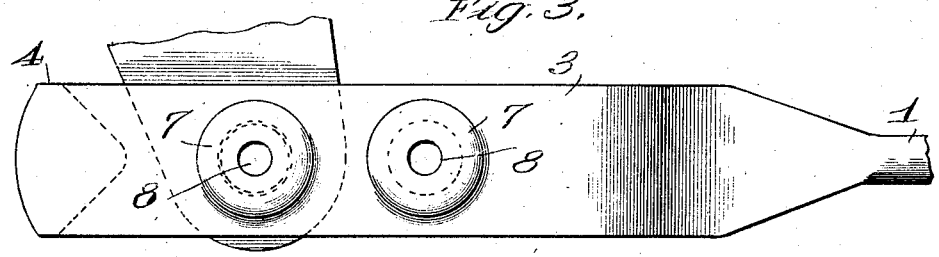
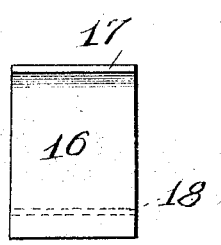
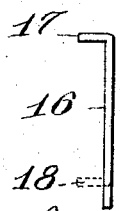
WITNESSES
INVENTOR
Ira S. Downing
By Edwin S. Clarkson Attorney

UNITED STATES PATENT OFFICE.

IRA S. DOWNING, OF COLLINWOOD, OHIO.

CAR-BRAKE RIGGING.

1,027,379.  Specification of Letters Patent.  Patented May 21, 1912.

Application filed February 13, 1912. Serial No. 677,319.

*To all whom it may concern:*

Be it known that I, IRA S. DOWNING, a citizen of the United States, residing at Collinwood, in the county of Cuyahoga and State of Ohio, have invented certain new and useful Improvements in Car-Brake Rigging, of which the following is a specification.

The object of my invention is to obviate the necessity of providing a head and threads on a bolt, also to eliminate the use of cotter pins for holding pins or bolts in place and while I have selected a part of a railway brake rigging for the purpose of illustrating my invention, it will be understood that its use is not thus restricted.

In the construction of standard brake riggings, the bolts which suspend bracket hangers, brake clevises, brake rods, fulcrums and other parts of the brake rigging, are usually secured in place by means of nuts and cotter pins and a large number of wrecks have been caused due to the cotter pins working out and the nuts working off of the bolts, allowing the brake rigging to drop on the track, all of which will be obviated by the use of my invention.

In the drawing, Figure 1 is a side elevation of a brake rod (broken away) of a brake rigging; Fig. 2 is a perspective view showing one key in locked position and the other key being inserted; Fig. 3 is an inverted plan of the brake rod; Fig. 4 is a top plan of the locking key; and Fig. 5 is a side elevation of the same.

1 represents a brake rod having a yoked end formed by the top member 2, the bottom member 3 and end member 4. The bottom member is provided with a bolt opening 5' extending therethrough from the top to the bottom wall thereof so as to provide a bearing for the inner end of the bolt 6 commensurate with the thickness of the bottom member 3.

7 is a boss formed on the under face of the bottom member 3 and extending across the bolt opening 5, thus forming a bottom for said opening.

8 is a drift opening in the boss through which water, dust, etc., may escape from the bolt opening 5, thus preventing undue wear by reason of foreign matter between the bolt and bolt opening.

The top member 2 of the yoke is provided with a bolt opening 9 in alinement with the opening 5 through which the bolt 6 is constructed to pass. Lugs 10 and 11 are positioned on diametric sides of the bolt opening 9 and are undercut as at 12 and 13, thus forming the overhanging comparatively thick walls 14 and 15, whereby a groove is formed constructed to receive the locking key 16. The locking key 16 is constructed of flat metal of a length greater than the length of the grooves 12 and 13, thus providing a portion at end for bending up as shown in Figs. 2 and 4, thus firmly clamping the key to the lugs 10 and 11. It will be seen that the lug 11 is between two bolt openings and that both edges are undercut to form a groove for the key.

In assembling, the end of the brake lever is passed in between the top and bottom members of the yoke on the brake rod and the bolt 6 is inserted in the openings 5 and 9 of the yoke and through the opening in the brake lever. The bolt being without a head its outer end may be flush with the upper face of the member 2 of the yoke, or slightly below, while the inner end is resting on the boss. The key 16 is bent up at right angles at one end to form a stop 17 and is then slid in the grooves 12 and 13 of the lugs 10 and 11 until the stop 17 is snug against one end of said lugs, whereupon the other end of the key is bent up at right angles against the other ends of the lugs 10 and 11 to form a lock 18, whereby the key 16 is securely locked between the lugs 10 and 11 against accidental displacement and closes the bolt opening 9 whereby the headless bolt 6 is prevented from dropping out, whereby a cheap and much safer construction is provided for joining the members of a brake rigging as no amount of vibrating or jarring of the parts can loosen the key 16 from its position over the bolt opening.

I claim:—

1. The combination with a member having a bolt opening, and a headless bolt in said opening, of a boss on said member closing one end of the bolt opening and provided with a drift opening, a slot on diametric sides of said bolt opening, and a key in said slot with its ends bent transverse of said slots.

2. The combination with a member having a bolt opening closed at one end, of lugs diametrically positioned with reference to the other end of said opening, grooves formed in said lugs and a key constructed to pass between said lugs with its edges in said grooves thereby closing the other end of the bolt opening, the ends of the key being bent transverse of the grooves and engaging the ends of the lugs whereby the key is securely locked between the lugs.

3. The combination with a member having a bolt opening closed at one end, and a headless bolt in said opening, of a groove on diametric opposite sides of the other end of said opening, and a key of greater length than said grooves and constructed to slide in said grooves thereby closing the other end of said opening and locking said bolt in said opening against accidental displacement, the ends of the key being bent transverse of the grooves whereby the key is locked in said grooves against accidental displacement.

4. The combination with a body having a bolt opening, of a boss on said body closing one end of said opening, said boss having a drift opening of less diameter than the bolt opening and communicating therewith, a slot formed transversely on said body at the other end of said bolt opening, and a key constructed to slide in said slot and close the said bolt opening.

In testimony whereof I affix my signature in presence of two witnesses.

IRA S. DOWNING.

Witnesses.
  B. F. KUHN,
  C. G. WALKER.

---

Copies of this patent may be obtained for five cents each, by addressing the "Commissioner of Patents, Washington, D. C."